(12) United States Patent
Czainski et al.

(10) Patent No.: US 8,997,955 B2
(45) Date of Patent: Apr. 7, 2015

(54) TRANSFERRING ELECTRIC ENERGY TO A VEHICLE BY INDUCTION

(75) Inventors: Robert Czainski, Berlin (DE); Juergen Meins, Braunschweig (DE); John Whaley, Filey (GB)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 13/988,551

(22) PCT Filed: Nov. 22, 2011

(86) PCT No.: PCT/EP2011/070718
§ 371 (c)(1),
(2), (4) Date: May 21, 2013

(87) PCT Pub. No.: WO2012/069495
PCT Pub. Date: May 31, 2012

(65) Prior Publication Data
US 2013/0248311 A1    Sep. 26, 2013

(30) Foreign Application Priority Data

Nov. 22, 2010  (GB) ................................ 1019800.0

(51) Int. Cl.
| B60L 9/00 | (2006.01) |
| B60L 5/00 | (2006.01) |
| B60M 1/34 | (2006.01) |
| B60M 7/00 | (2006.01) |
| H01F 41/02 | (2006.01) |

(52) U.S. Cl.
CPC . *B60L 9/00* (2013.01); *B60L 5/005* (2013.01); *B60M 1/34* (2013.01); *B60M 7/003* (2013.01); *H01F 41/02* (2013.01); *B60L 2200/26* (2013.01)

(58) Field of Classification Search
USPC ........................ 191/10, 14; 29/605, 606, 607
See application file for complete search history.

(56) References Cited

U.S. PATENT DOCUMENTS

| 2,432,982 | A | * | 12/1947 | Braddon et al. | ................. 336/83 |
| 4,836,344 | A | * | 6/1989 | Bolger | ............................ 191/10 |
| 5,207,304 | A | * | 5/1993 | Lechner et al. | ................. 191/10 |
| 5,669,470 | A | * | 9/1997 | Ross | ................................ 191/10 |
| 6,407,470 | B1 | * | 6/2002 | Seelig | ............................ 307/104 |
| 6,515,878 | B1 | * | 2/2003 | Meins et al. | ..................... 363/37 |

(Continued)

FOREIGN PATENT DOCUMENTS

| CN | 1438948 A | 8/2003 |
| DE | 4115568 A1 | 2/1993 |

(Continued)

*Primary Examiner* — Jason C Smith
(74) *Attorney, Agent, or Firm* — The Webb Law Firm

(57) ABSTRACT

A system for transferring electric energy to a vehicle, wherein the system comprises an electric conductor arrangement for producing a magnetic field and for thereby transferring the energy to the vehicle, wherein the electric conductor arrangement comprises at least one current line, wherein each current line is adapted to carry the electric current which produces the magnetic field or is adapted to carry one of parallel electric currents which produce the magnetic field and wherein:
the at least one current line extends at a first height level,
the system comprises an electrically conductive shield for shielding the magnetic field, wherein the shield extends under the track and extends below the first height level, and
a magnetic core extends along the track at a second height level and extends above the shield.

16 Claims, 14 Drawing Sheets

(56) References Cited

U.S. PATENT DOCUMENTS

| | | | |
|---|---|---|---|
| 7,635,053 B2* | 12/2009 | Kozsar | 191/10 |
| 8,292,052 B2* | 10/2012 | Bohori et al. | 191/10 |
| 8,360,216 B2* | 1/2013 | Meins et al. | 191/10 |
| 8,544,622 B2* | 10/2013 | Vollenwyder et al. | 191/10 |
| 8,590,682 B2* | 11/2013 | Meins et al. | 191/10 |
| 2005/0178632 A1* | 8/2005 | Ross | 191/10 |
| 2006/0157313 A1 | 7/2006 | Schirmeier et al. | |
| 2007/0089956 A1* | 4/2007 | Kozsar | 191/10 |
| 2011/0163542 A1* | 7/2011 | Farkas | 290/2 |
| 2011/0198176 A1* | 8/2011 | Meins et al. | 191/10 |
| 2011/0253495 A1* | 10/2011 | Vollenwyder et al. | 191/10 |
| 2011/0259694 A1* | 10/2011 | Matsumura | 191/10 |
| 2012/0055751 A1* | 3/2012 | Vollenwyder et al. | 191/10 |
| 2012/0085610 A1* | 4/2012 | Alexandre | 191/10 |
| 2012/0145500 A1* | 6/2012 | Staunton et al. | 191/10 |
| 2013/0112519 A1* | 5/2013 | Anders | 191/10 |
| 2013/0233663 A1* | 9/2013 | Czainski et al. | 191/10 |
| 2013/0248311 A1* | 9/2013 | Czainski et al. | 191/10 |
| 2014/0116831 A1* | 5/2014 | Woronowicz | 191/10 |
| 2014/0138199 A1* | 5/2014 | Ichikawa et al. | 191/10 |
| 2014/0151175 A1* | 6/2014 | Vietzke | 191/10 |

FOREIGN PATENT DOCUMENTS

| | | |
|---|---|---|
| EP | 0289868 A2 | 4/1988 |
| GB | 657035 A1 | 9/1951 |
| WO | 9530556 A2 | 11/1995 |
| WO | 2010031596 A2 | 3/2010 |

* cited by examiner

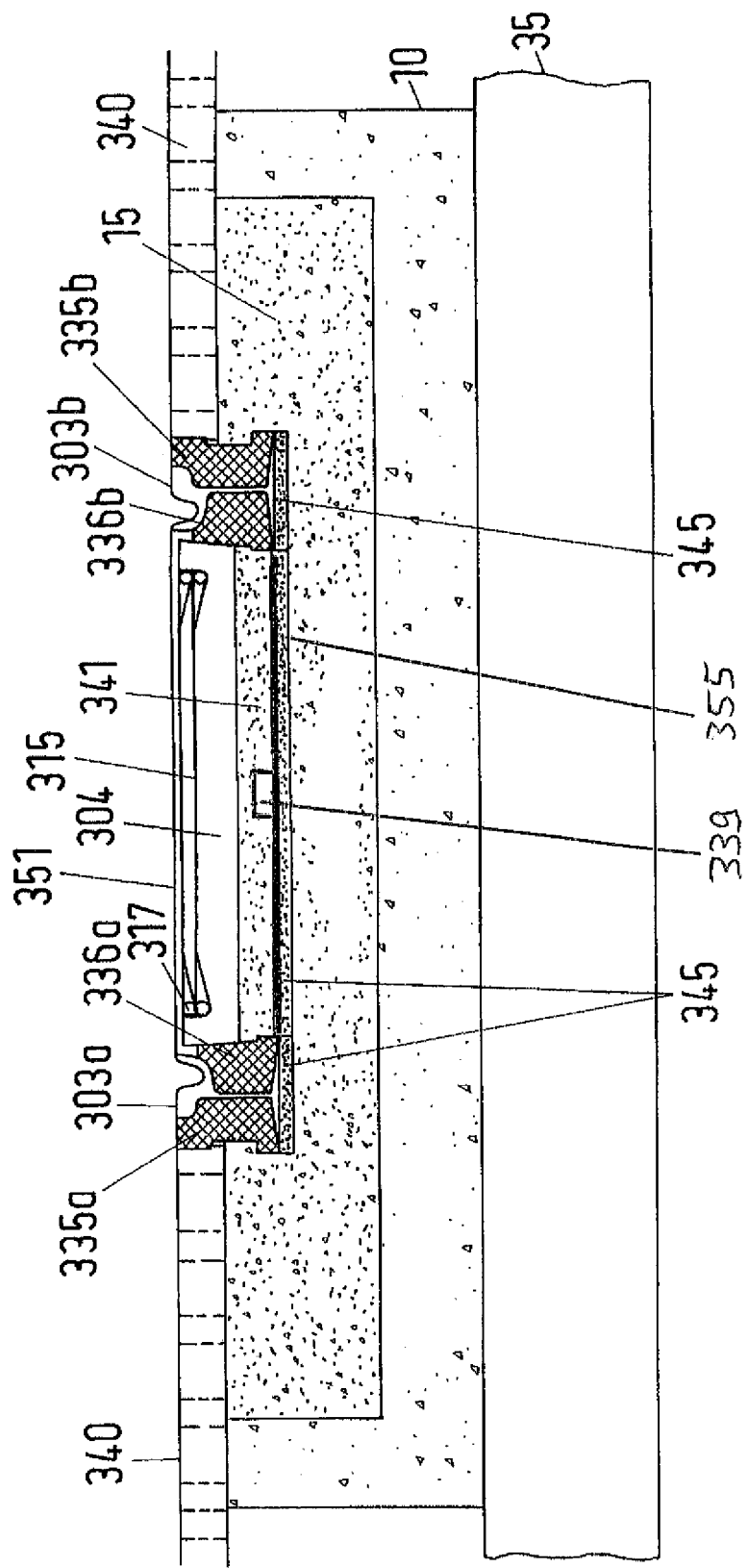

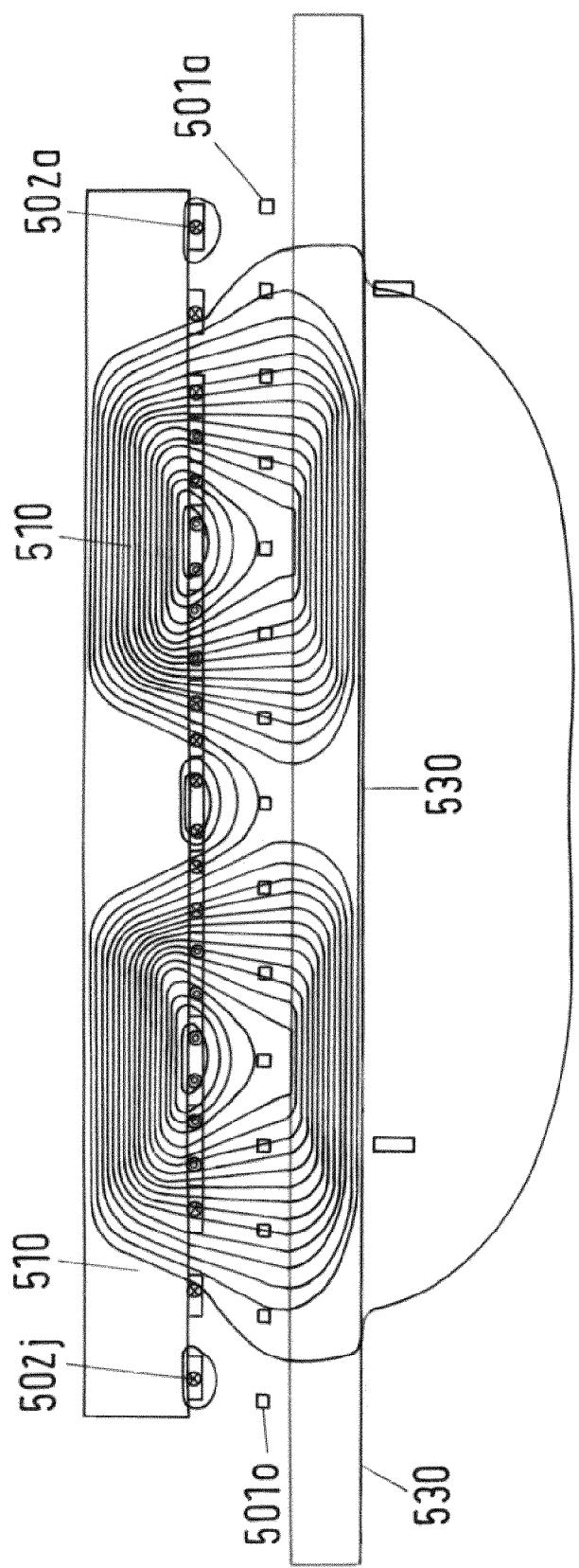

TRANSFERRING ELECTRIC ENERGY TO A VEHICLE BY INDUCTION

BACKGROUND OF THE INVENTION

1. Field of the Invention

The invention relates to a system for transferring electric energy to a vehicle, in particular to a road automobile or to a track bound vehicle such as a light rail vehicle (e.g. a tram). Examples of track bound vehicles are conventional rail vehicles, mono-rail vehicles, metros and busses (which may be guided on the track by optical means or mechanical means other than rails).

2. Description of Related Art

Track bound vehicles, in particular vehicles for public passenger transport, usually comprise a contactor for mechanically and electrically contacting a line conductor along the track, such as an electric rail or an overhead line. Typically, at least one propulsion motor on board the vehicles is fed with the electrical power from the external track or line and produces mechanic propulsion energy. In addition or alternatively, the transferred energy can be used for operating auxiliary systems of the vehicle. Such auxiliary systems, which do not produce traction of the vehicle, are, for example, lighting systems, heating and/or air conditioning system, the air ventilation and passenger information systems. Not only track-bound vehicles (such as trams), but also road automobiles (for example having four wheels with tyres to drive on a road) can be operated using electric energy.

If continuous electric contact between the travelling vehicle and an electric rail or wire along the route is not desired, electric energy can either be withdrawn from an on-board energy storage or can be received by induction from an arrangement of electric lines of the route.

The transfer of electric energy to the vehicle by induction forms a background of the invention. A route side (primary side) conductor arrangement produces a magnetic field, which is in particular a component of an alternating electromagnetic field. The field is received by a coil (secondary side) on board of the vehicle so that the field produces an electric voltage by induction. The transferred energy may be used for propulsion of the vehicle and/or for other purposes such as providing auxiliary systems of the vehicle (e.g. the heating and ventilating system) with energy.

Generally speaking, the vehicle may be, for example, a vehicle having an electrically operated drive motor. However, the vehicle may also be a vehicle having a hybrid drive system, e.g. a system which can be operated by electric energy or by other energy, such as energy provided using fuel (e.g. natural gas, diesel fuel, petrol or hydrogen).

WO 95/30556 A2 describes a system wherein electric vehicles are supplied with energy from the roadway. The all-electric vehicle has one or more on-board energy storage elements or devices that can be rapidly charged or supplied with energy obtained from an electric current, for example a network of electromechanical batteries. The energy storage elements may be charged while the vehicle is in operation. The charging occurs through a network of power coupling elements, e.g. coils, embedded in the track. Induction coils are located at passenger stops in order to increase passenger safety.

U.S. Pat. No. 4,836,344 discloses an electrical modular roadway system adapted for transmitting power to and controlling inductively coupled vehicles travelling thereon. The system comprises a plurality of elongated, electrically connected inductor modules arranged in an aligned end to end spaced apart order to form a continuous vehicle path. Each module has a magnetic core and power windings which generate a magnetic field extending above the road surface. The modules are embedded in the ground so as to be flush with the roadway surface over which a vehicle can travel. Each module is an elongated structure of uniform width and thickness so that they can be easily fabricated in quantity and readily installed in a roadbed with a minimum of labor and equipment. Each module comprises an iron core around which is wrapped a power winding comprising a series of coils.

Although the electric conductors are arranged immediately above the ground or are buried in the ground, there may be systems or devices below the conductor arrangement and, consequently, electromagnetic compatibility (EMC) requires to keep intensities of electromagnetic fields or magnetic fields small.

SUMMARY OF THE INVENTION

It is an object of the present invention to provide a system of the kind described above and a method of building such a system, which reduces electromagnetic field intensions below the conductor arrangement and does not significantly deteriorate the efficiency of the transfer of energy by induction to the vehicle. Furthermore, the amount of expensive material, such as ferromagnetic material shall be kept small.

It is a basic idea of the present invention to use a combination of a shield which shields the field produced by the conductor arrangement and of a magnetic core.

Principally, a shield, for example a layer of aluminium sheets, is usually sufficient to reduce field intensities below the conductor arrangement. Therefore, a shield could help avoiding the use of expensive ferromagnetic material, such as ferrite. However, especially for preferred conductor arrangements which are operated using alternating electric currents at frequencies which are resonant frequencies of the respective conductor arrangement on the secondary side of the vehicle, the shield would put the total arrangement consisting of the primary side and secondary side conductor arrangement out of tune with respect to effective transfer of energy (which should take place at the resonant frequency of the secondary side). In addition, the shielding effect of electrically conductive material is produced by eddy currents, so that the shielding effect causes energy losses.

On the other hand, the sole use of magnetic core material would increase magnetic flux, but would also put the primary side/secondary side conductor arrangement out of tune. Principally, it is possible to reduce the field intensity below the primary side conductor arrangement by providing a layer of magnetic core material (ferromagnetic material) below the conductor arrangement. Due to the ferromagnetic properties, the magnetic flux lines would be guided within the layer nearly parallel to the layer surfaces, so that the flux below or beyond the magnetic core material would be nearly zero. However, this would require a substantial amount of magnetic core material, since the layer width (in horizontal direction) needs to be as large as the width of the primary side conductor arrangement, especially if the electric lines of the conductor arrangement follow a meandering path extending in the direction of travel (as preferred, see below). Therefore, the width of the conductor arrangement would be in the range of some tens of centimeters for a typical railway or motor vehicle route and the required amount of magnetic core material would be extremely large.

Therefore, a combination of a shield of electrically conducting material (which is not ferromagnetic) and a magnetic core is used. Preferably, the amount of magnetic core material and the geometric configuration of the arrangement consisting of the magnetic core and the shield is adapted in such a manner that the total system of the primary side conductor arrangement and the secondary side conductor arrangement in the vehicle or on the vehicle are in tune with respect to resonant frequency transfer of electromagnetic energy. I.e. the frequency of the electromagnetic field which is produced by the primary side conductor arrangement causes an induction of electromagnetic current at the resonant frequency of the secondary side conductor arrangement. The electrically conductive shield material has the effect of reducing the resonance frequency and the magnetic core material has the effect of increasing the resonance frequency. Therefore, a combination of a shield and a magnetic core can produce an arrangement which does not alter the resonance frequency of the secondary side conductor arrangement due to compensating effects.

In practice, the shield can be provided first, and the amount and/or geometric arrangement of the magnetic core material can be varied to find the combination of shield and magnetic core which has the desired effect on the resonance frequency (namely preferably no effect).

In particular, the magnetic core material is placed below the electric line or lines of the primary side conductor arrangement which produce the electromagnetic field. In contrast to the arrangement disclosed in U.S. Pat. No. 4,836,344 (see above) the primary side electric line or lines are not wound around the magnetic core. Rather, it is preferred that the electric line or lines of the primary side conductor arrangement extend substantially horizontally, which means that curves and bends of the electric line or lines extend within a substantially horizontal plane. "Horizontal" refers to the case that the track or road on which the vehicle travels does not have an inclination. If there is such an inclination, the horizontal plane is preferably also inclined to follow the inclination and extension of the track or route. The extension of the electric line or lines within the substantially horizontal plane is in contrast to the descending and ascending extension of an electric line which is wound around a magnetic core, for example according to U.S. Pat. No. 4,836,344.

Preferably, the magnetic core extends in the direction of travel, in particular continuously, i.e. without interruption. However, small gaps between consecutive blocks of magnetic core material are not considered to be interruptions. On the other hand, an interruption will be a gap which is wider than the width of the electric line or lines of the primary side conductor arrangement.

In particular, the magnetic core may have a width of less than 30%, preferably less than 20% of the width of the primary side conductor arrangement (excluding any electric connections to devices sideways of the track or route). The basic finding behind the idea of using a narrow magnetic core extending in the direction of travel is that a shield of electrically conducting material which has a width of the same order of magnitude as the width of the conductor arrangement sufficiently shields the areas below the shield against magnetic fields and the magnetic core sufficiently compensates the effect of the shield, even if the magnetic core is narrow. As mentioned above, the compensation is not only for keeping the total system in tune with respect to the resonance frequency of the secondary side, but the compensation also has the effect that the magnetic flux of the field in the range between the primary side and the secondary side is not smaller or not significantly smaller than the flux without shield. In case of the preferred embodiment in which line sections of the electric line or lines of the conductor arrangement extend transversely to the direction of travel, a narrow magnetic core would result in a high magnetic flux in the area above the magnetic core, but would not significantly increase the flux in other areas between the primary side conductor arrangement and the secondary side conductor arrangement. However, the total magnetic flux over the extension of such a transversely extending electric line section is increased by the magnetic core. The total magnetic flux can be, for example, calculated by integrating the magnetic flux over the length of the transversely extending line section.

Instead of only one magnetic core, the system may comprise two or more magnetic cores extending in the direction of travel. Such a plurality of magnetic cores increases the homogeneity of the magnetic flux in the direction of transversely extending line sections.

For example, the desired compensation effect produced by the magnetic core or magnetic cores can be set by varying the thickness of the magnetic core in vertical direction and/or the distance of the magnetic core to the electric line or lines and/or to the shield. "Varying" means finding a configuration of the combination of the primary side electric conductor arrangement, the shield and the magnetic core or cores. For a given configuration, the thickness of the magnetic core or cores is preferably constant over the extension in the direction of travel.

For example, the material of the magnetic core is placed in grooves and/or recesses of pre-fabricated modules adapted to carry the material and to fix the alternating current line or lines. An example of such a module will be described below. Blocks consisting of the magnetic core material may be fixed on the pre-fabricated module using adhesive.

In particular, the following is proposed: A system for transferring electric energy to a vehicle, in particular to a road automobile or to a track bound vehicle such as a light rail vehicle, wherein the system comprises an electric conductor arrangement for producing a magnetic field and for thereby transferring the energy to the vehicle, wherein the electric conductor arrangement comprises at least one current line, wherein each current line is adapted to carry the electric current which produces the magnetic field or is adapted to carry one of parallel electric currents which produce the magnetic field and wherein:

the current line or lines extend(s) at a first height level,
the system comprises an electrically conductive shield for shielding the magnetic field, wherein the shield extends under the track and extends below the first height level, and
a magnetic core extends along the track at a second height level and extends above the shield.

Furthermore, a method of building a system for transferring electric energy to a vehicle is proposed, in particular for transferring electric energy to a road automobile or to a track bound vehicle such as a light rail vehicle, wherein an electric conductor arrangement for producing a magnetic field and for thereby transferring the energy to the vehicle is provided, wherein at least one current line is provided for the electric conductor arrangement, each current line being adapted to carry the electric current which produces the magnetic field or is adapted to carry one of parallel electric currents which produce the magnetic field and wherein:

the current line or lines is/are arranged to extend at a first height level,
an electrically conductive shield is provided for shielding the magnetic field, wherein the shield is arranged so that it extends under the track and so that it extends below the first height level, and
a magnetic core is provided so that it extends along the track at a second height level and so that it extends above the shield.

Extending at a first height level means that the current line or lines extend within a range of heights with reference to a hypothetical plane (for example in case of a rail vehicle a plane including the surfaces of the rails or in case of a road automobile the surface of the road) on which the vehicle travels. However, parts of the alternating current line or lines may extend at a different height level, in particular below the first height level. These parts may be connections of the alternating current line or lines from devices (such as switches, inverters, capacitors, inductors and combinations thereof) sideways of the track to line sections in and/or under the track which produce the electromagnetic field for providing the vehicle with energy. This means that at least a majority (in terms of the length of the line) of line sections of the alternating current line or lines extends at the first height level.

The second height level at which the magnetic core extends may be below the first height level, wherein the magnetic core is preferably provided so that it extends between the shield and the current line or lines.

The magnetic core is preferably provided so that it extends in the direction of travel. Advantages and embodiments are described above.

An arrangement of electrical conductors along the track can be realised in a variety of ways. In principle, the conductors or lines can be cables laid in the ground as usual in road construction or underground engineering. However, especially for road construction, pre-fabricated modules having grooves or other means for receiving the line or lines are favourable.

In particular, a route for vehicles driving on a surface of the route, in particular for road automobiles, may have the following features:
- the route comprises a plurality of shaped blocks adapted to position and/or to hold a plurality of line sections of one or more electric lines,
- each shaped block comprises recesses forming spaces and/or projections delimiting spaces for receiving at least one of the line sections,
- the electric line or lines extend(s) through the spaces,
- the electric line or lines extend(s) along the surface of the route in and/or about the travelling direction of vehicles which are driving on the route,
- the shaped blocks and the electric line or lines are supported by a base layer of the route,
- the shaped blocks and the electric line or lines are covered by a cover layer of the route,
- the material of the cover layer is also located in regions of the route sideways of the shaped blocks so that the shaped blocks and the cover layer form an integrated layer on top of the base layer.

Preferably, the shield is placed between the base layer and the shaped blocks.

In particular, the material of the magnetic core is placed in grooves and/or recesses of pre-fabricated modules (such as the shaped blocks mentioned above) so that the modules carry the material, wherein the current line or lines is/are fixed by the modules. For example, the electrically conductive shield can be integrated in a pre-fabricated track module or can be attached to the module, before the module is placed on site during the construction of the track or route. However, it is preferred to place the electrically conductive shield first and then to place the module or parts of the module on top of the shield. Optionally any additional material and/or element can be placed on top of the shield, before a shaped block of the module for positioning electric line sections is placed.

Most preferred, the current line or lines are arranged so that it/they comprise(s) a plurality of line sections extending transversely to the direction of travel. Transversely extending line sections for providing the vehicle with energy while travelling. wherein the line sections are part of a meandering path followed by the line, have the advantage that magnetic fields sideways of the track compensate each other. Especially these (and preferably all) transversely extending line sections are located at the first height level. Although not preferred, parts of other line sections which connect the transversely extending line sections may extend below the first height level and even below the shield.

Furthermore, transversely extending line sections have the advantage that the secondary side, where induction takes place on the vehicle, may have a varying distance to the primary side conductor arrangement. The combination of a shield and a magnetic core will still have no effect on the secondary side if the distance between the primary side and the secondary side is not greater than about 30% of the length of the transversely extending line section.

The shield material is a non-ferromagnetic material, but electrically conductive material. Magnetic fields produce eddy currents in the shield material which in turn compensate the magnetic field beyond the shield.

The shield may extend substantially parallel to the track on which the vehicle may travel. The shield may extend substantially horizontal, in particular in a layer. "Parallel" means that the shield extends in a horizontal plane or substantially horizontal plane (see above) if the vehicle is travelling along a horizontal or substantially horizontal plane. For example, in case of a road vehicle, the shield extends parallel or substantially parallel to the surface of the road.

The shield may comprise a plurality of sheets of electrically conductive material, e.g. aluminium sheets. Alternatively, the shield may be a mesh of metal, for example copper. For example, the shield may be integrated in concrete or other material of a pre-fabricated track module. In this case, the shield is protected against damage. The shield, in particular the mesh, may be bolted or otherwise fixed to the bottom part of the track or route construction. On the other hand when a shield in form of metal sheets is placed on site, where the track or route is to be built, the risk of damage is small and it can be fixed by placing a layer of building material, such as concrete or asphalt on top of the sheets. In particular, the shield may be placed between horizontally extending layers of other material, such as between a base layer and an intermediate or top layer.

The shield may extend in a (preferably, with respect to the direction of travel continuously extending) layer below the track on which the vehicle may travel. Preferably, there are no significant gaps between elements (e.g. sheets) of the shield. Preferably, any gap is smaller than the width of the electric line or lines.

Preferably, the magnetic field which is produced by the electric conductor arrangement, is the magnetic field component of an alternating electromagnetic field, i.e. an alternating current flows through the electric line or lines for producing the magnetic field. In addition it is preferred that the at least one current line is an alternating current line, wherein each alternating current line is adapted to carry the only phase or one of plural phases (preferably one of three phases) of an alternating electric current. The frequency of the alternating current which flows through the conductor arrangement may be in the range of 1-100 kHz, in particular in the range of 10-30 kHz, preferably about 20 kHz.

The material of the magnetic core has preferably a relative permeability $\mu_r$ in the range between 300 and 10.000. Ferrite or a ferrite compound are preferred as material of the magnetic core.

BRIEF DESCRIPTION OF THE DRAWINGS

Examples and preferred embodiments of the invention will be described with reference to the attached figures which show FIG. 1 schematically a road having two lanes, wherein electric lines are laid under the surface of one of the lanes using pre-fabricated shaped blocks, FIG. 2 a vertical cross section through a first preferred embodiment of a route, for example part of the road shown in FIG. 1, FIG. 3 an exploded view of part of FIG. 2, FIG. 4 a perspective view of a preferred embodiment of a shaped block, which can be used as a support element for supporting electric lines, in particular cables, FIG. 5 a top view of the shaped block shown in FIG. 4, FIG. 6 a vertical cross-section through half of the block of FIGS. 4 and 5, FIG. 7 a vertical cross section through a second preferred embodiment of a route, namely a track of a rail vehicle, FIG. 8 an exploded view of a cross-section of a second first embodiment of a railway track, FIG. 9 consecutive segments of a conductor arrangement which may be integrated in the route, for producing an electromagnetic field, FIG. 10 a preferred embodiment of a three-phase conductor arrangement at the transition zone of two consecutive segments of the conductor arrangement, wherein a cut-out of at least one shaped block is used to direct cables within the route to devices and/or connections sideways of the route, FIG. 11 an arrangement similar to the arrangement shown in FIG. 10, wherein the cut-out is used to form two star point connections of the three phases of the consecutive segments, FIG. 12 schematically a simple construction of a route comprising an electric line section extending transversely to the direction of travel and a magnetic core, FIG. 13 schematically a side of view of a system for inductively transferring energy to a vehicle, including the primary side and the secondary side electric lines, FIG. 14 a side view of an arrangement similar to FIG. 13, but including a shield, and FIG. 15 a side view of an arrangement similar to FIGS. 13 and 14, but including a magnetic core.

DETAILED DESCRIPTION OF THE INVENTION

Figure 1:
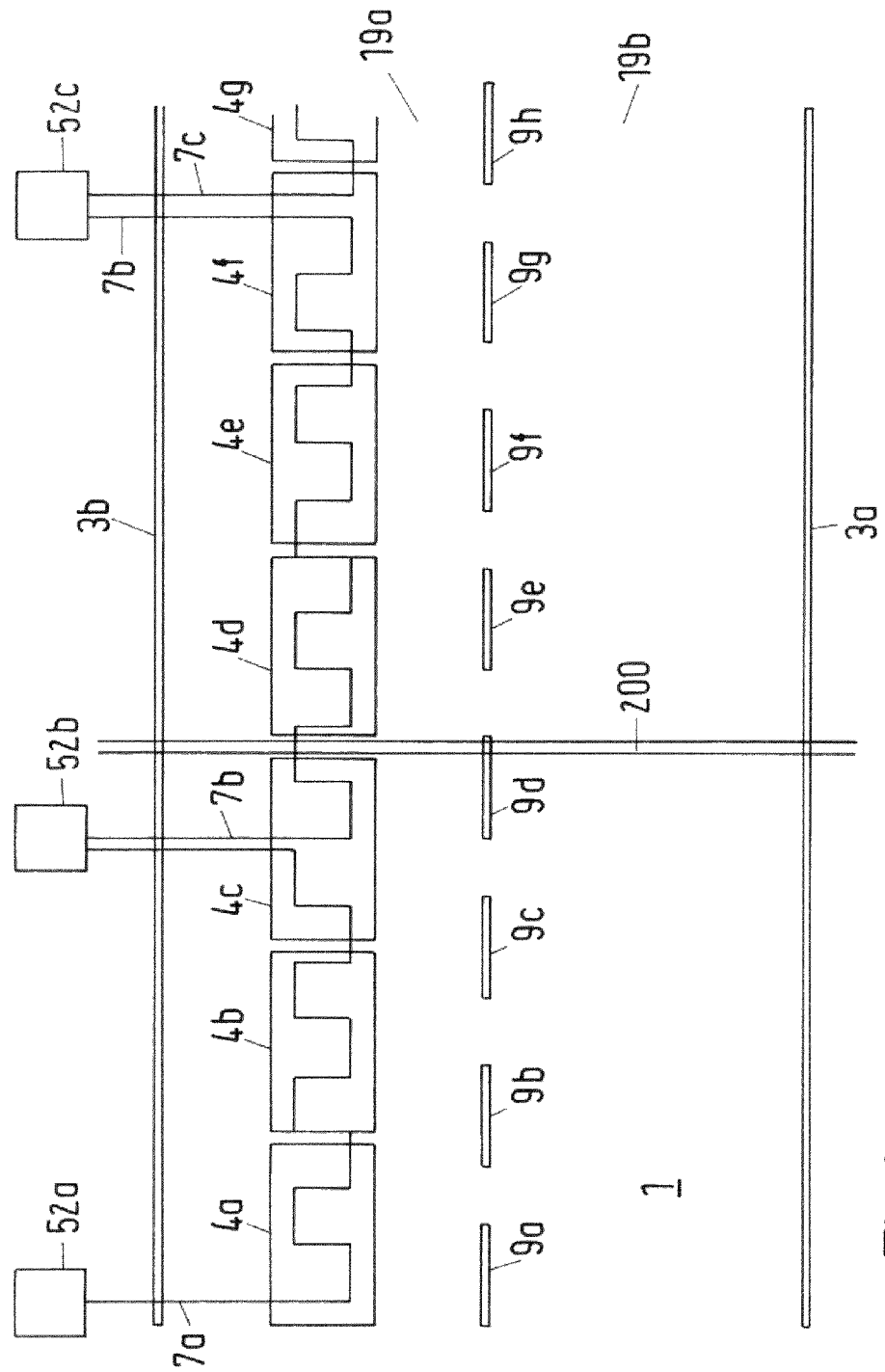

The schematic top view of FIG. 1 shows a road 1 having two lanes 19a, 19b. The lanes 19 are limited by a solid line 3a, 3b at the outer margins and are limited by a common dashed line made of line segments 9a, 9b, 9c, 9d, 9e, 9f, 9g, 9h. Consequently, the direction of travel extends from left to right or from right to left in FIG. 1. The width of the lanes 19 is large enough so that a vehicle can travel on either lane 19a or lane 19b or so that two vehicles can travel next to each other on the lanes 19.

One of the lanes, namely lane 19a, is equipped with a conductor arrangement 7a, 7b, 7c for producing an electromagnetic field. The conductors 7 (for example three electric phase lines in each segment of the conductor arrangement) and shaped blocks 4, which hold the conductors in place, are not visible in practice, if the road is viewed from above. However, FIG. 1 shows the conductors 7 and the line of consecutive shaped blocks 4a, 4b, 4c, 4d, 4e, 4f, 4g. The line of consecutive shaped blocks continues towards the right beyond the limits of FIG. 1. The conductor arrangement comprises at least three consecutive segments 7a, 7b, 7c which can be operated separately of each other. This means, for example, conductor 7a is operated while a vehicle (not shown) travels above the segment whereas the other segment 7b, 7c are not operated. If the vehicles reaches segment 7b, this segment is switched on and segment 7a is switched off. Corresponding switches and/or inverters may be integrated in devices 52a, 52b, 52c shown in the top region of FIG. 1.

The preferred way of laying the conductors 7 is to form a meandering path or paths, which means that the conductor has sections that extend transversely to the direction of travel. For example, conductor 7a has three transversely extending sections at shaped block 4a, one transversely extending section at the transition zone to consecutive block 4b, three transversely extending sections in the region of block 4b and one transversely extending section at block 4c where conductor 7a is connected to device 52b. In practice, it is preferred to use at least two phases for each segment of the conductor arrangement.

In the middle section of FIG. 1 there are two parallel lines extending transversely to the direction of travel. These lines are lines at the end of route segments having a gap 200 between each other for allowing relative movement and/or thermal expansion or contraction. The gap 200 is located between two consecutive shaped blocks 4c, 4d and conductor 7b extends across the gap 200 which may be filled with an elastically deformable material, such as bitumen.

Figure 2:
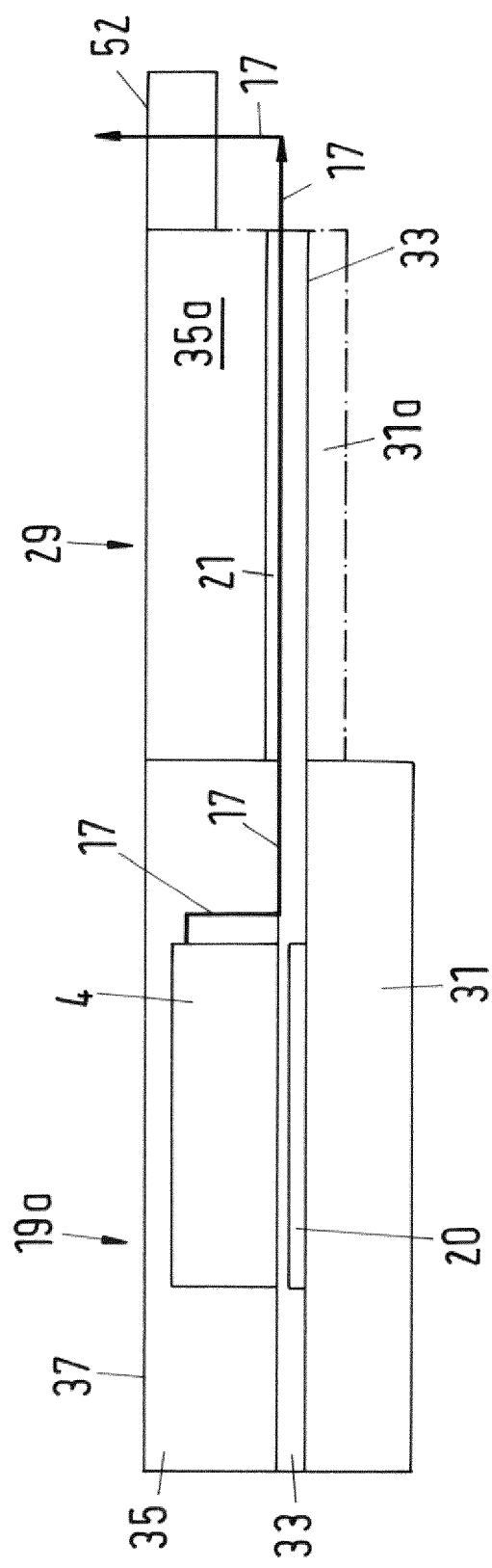

FIG. 2 shows a vertical cross section through a preferred embodiment of a route, wherein the direction of travel for vehicles travelling on the route extends perpendicularly to the image plane of FIG. 2. FIG. 2 may show, for example, a cross section of lane 19a of FIG. 1 and shows a cross section of an emergency lane which may be located in FIG. 1 in the top region where the devices 52 are shown. The emergency lane is indicated in FIG. 2 by reference numeral 29. Sideways, on the right hand side of emergency lane 29, one of the devices 52 is shown in FIG. 2.

Lane 19a comprises a base layer 31 which may have, for example, a layer thickness of 20 cm. On top of the base layer 31, a layer 20 of electrically conducting material (such as aluminium plates) is laid, for example having a thickness of 5 mm. The purpose of the layer 20 is to shield the electromagnetic field, i.e. to prevent or reduce electromagnetic waves below the layer 20. The layer 20 is narrower than the width of the lane 19a and may be in the range of the width of shaped block 4 which is placed above layer 20.

Shielding layer 20 is embedded in an intermediate layer 33 which may have a thickness of 5 cm, for example. On top of intermediate layer 33, shaped block 4 is placed, for holding electric lines 17, for example in the meandering manner similarly to the arrangement shown in FIG. 1. Block 4 may have a thickness of 15 cm, for example. The connection of electric line 17 from block 4 downwards to the upper surface of intermediate layer 33 and sideways through emergency lane 29 to device 55 is shown in FIG. 2.

Block 4 is embedded in a cover layer 35, which may have a thickness of 20 cm. Optionally, a top layer 37 may be provided to form the surface of lane 19a and the emergency lane 29.

Base layer 31 extends over the whole width of lane 19a. Emergency lane 29 may have a base layer 31a of the same material, but preferably having a smaller thickness of for example 8 cm. Cover layer 35 extends over the whole width of lane 19a, which means that it has regions on both sides of block 4 (which are regions sideway of the shaped block in the wording used above) and which means that the thickness of cover layer 35 sideways of block 4 is greater than the thickness of the cover layer 35 on top of block 4. Emergency lane 29 may have a cover layer 35a of the same material having a constant thickness. However, in order to shield the conductor 17, a layer 21 of electrically insulating material, for example aluminium (e.g. having a thickness of 1 cm) may be located at the bottom of cover layer 35a immediately above the connection of conductor 17. By such a shielding layer 21 which preferably extends over the whole widths of emergency lane 29, electromagnetic emission to the ambiance is significantly reduced. If segments of the conductor arrangement are operated only while a vehicle is travelling on the segment, the vehicle shields the ambience from the electromagnetic field produced by the conductor arrangement. Therefore, shielding the section of the conductor 17 between the emergency lane 29 and the shaped block 4 would result in a minor improvement only.

The base layer may be made of sand cement. The intermediate layer 33 may be made of asphalt. The shaped block 4 and the cover layer 35 may be made of fibre concrete.

Figure 3:
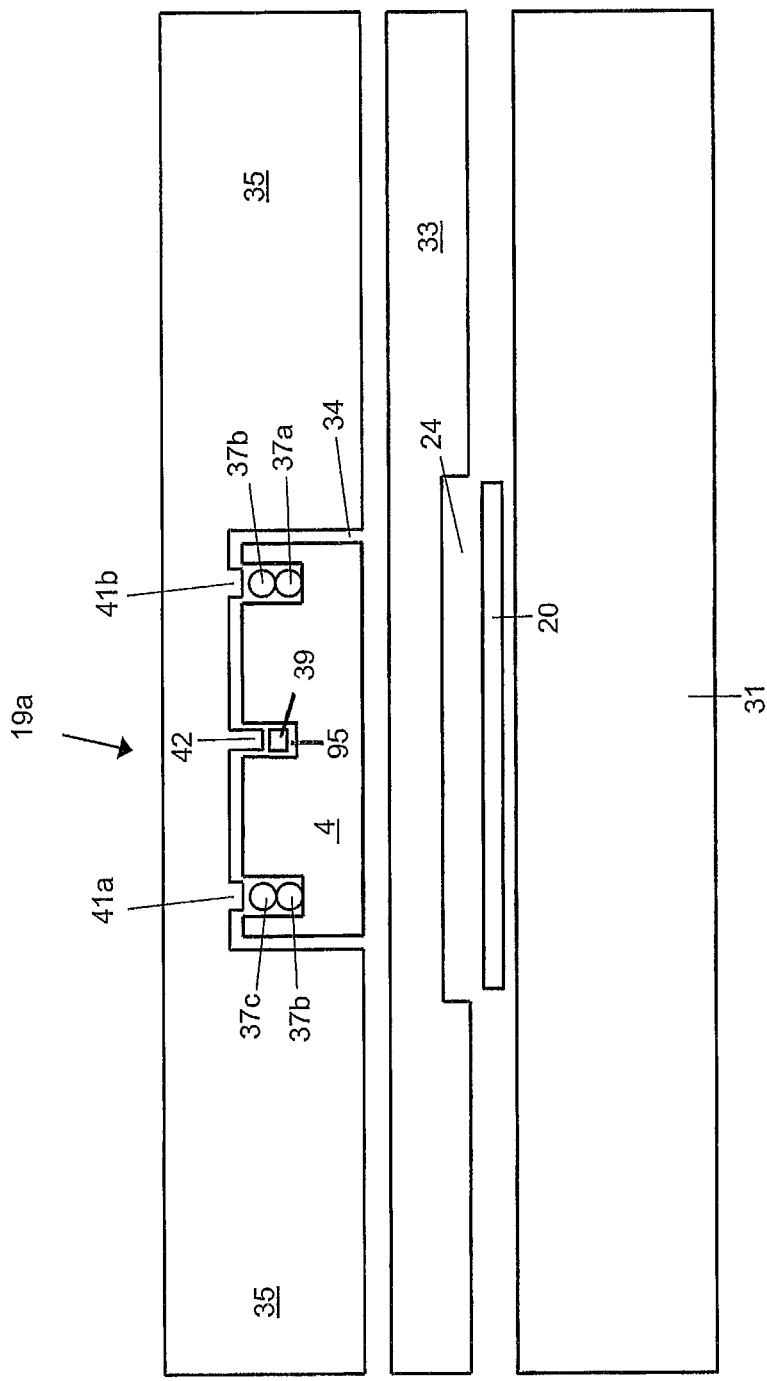

FIG. 3 shows an exploded view of the construction of lane 19a corresponding to the construction shown in FIG. 2. The same reference numerals refer to the same parts of the construction.

Since shielding layer 20 is provided before intermediate layer 33 is produced, intermediate layer 33 will have a recess 24 where shielding layer 20 is located.

Similarly, recesses within shaped block 4 which are facing upwards and which contain sections 37a, 37b, 37c of electric lines and which preferably contain also magnetic core material 39 within a recess 95 in the centre line of block 4, receive material portions 41a, 41b and 42 as schematically indicated in the top region of FIG. 3. These material regions preferable fill all or nearly all remaining gaps between electric line sections 37 or the magnetic core material 39 and the walls of the recesses.

Figure 4:
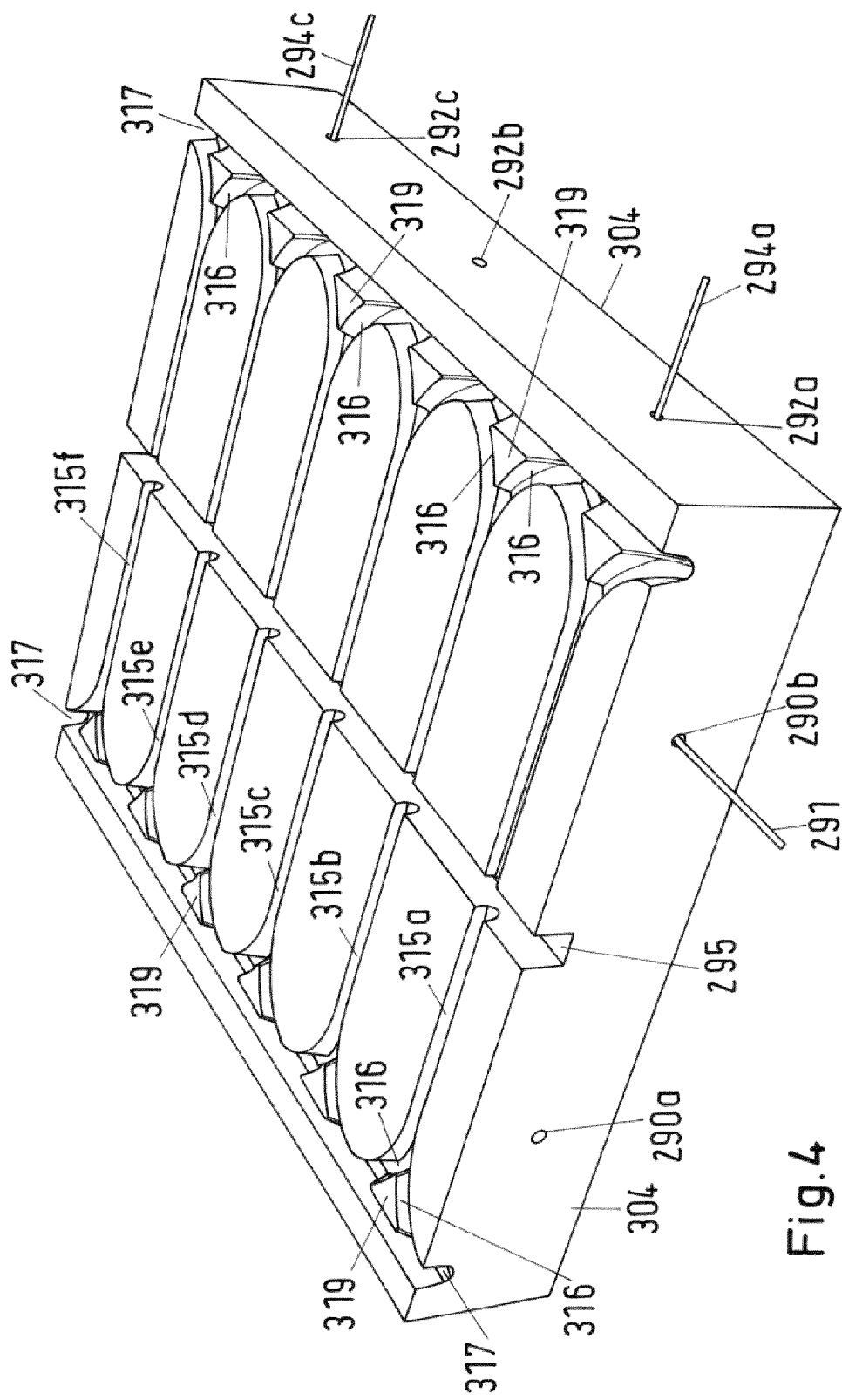
Figure 5:
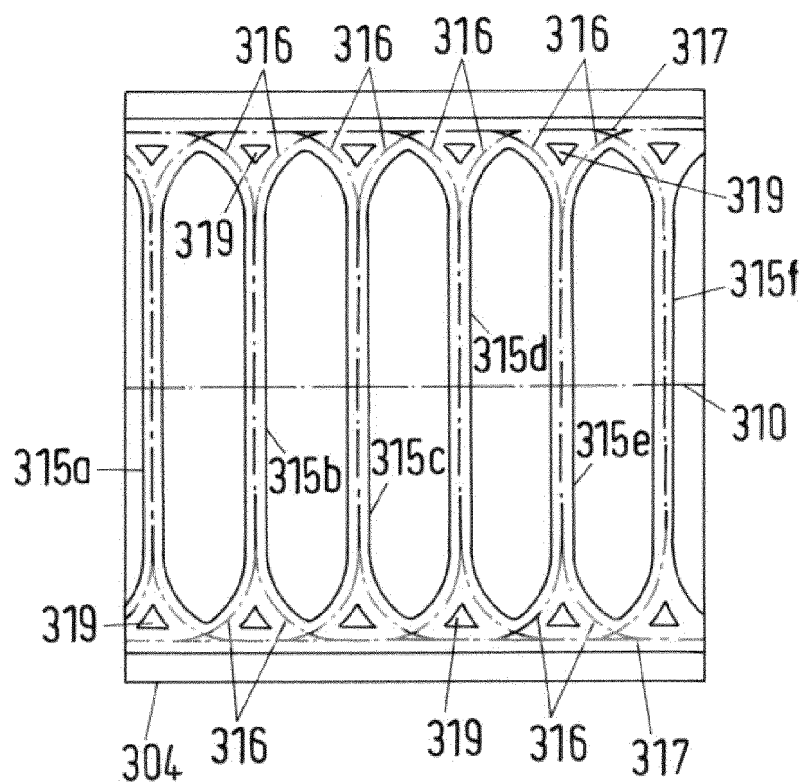

FIG. 4 shows a perspective view of a shaped block 304 and FIG. 5 shows a top view of the shaped block 304, which comprises six recesses 315a-315f extending perpendicularly to a centre line 310 which divides the block 304 in two halves. The centre line 310 extends in the direction of travel of a vehicle, if the block 304 forms part of a route for the vehicle.

The recesses 315 are parallel to each other and are arranged within the same horizontal plane which is parallel to the plane of FIG. 5. The recesses 315 extend in width direction (the vertical direction in FIG. 5) over about three quarters of the total width of block 304. They are arranged symmetrically to the centre line 310.

Figure 10:
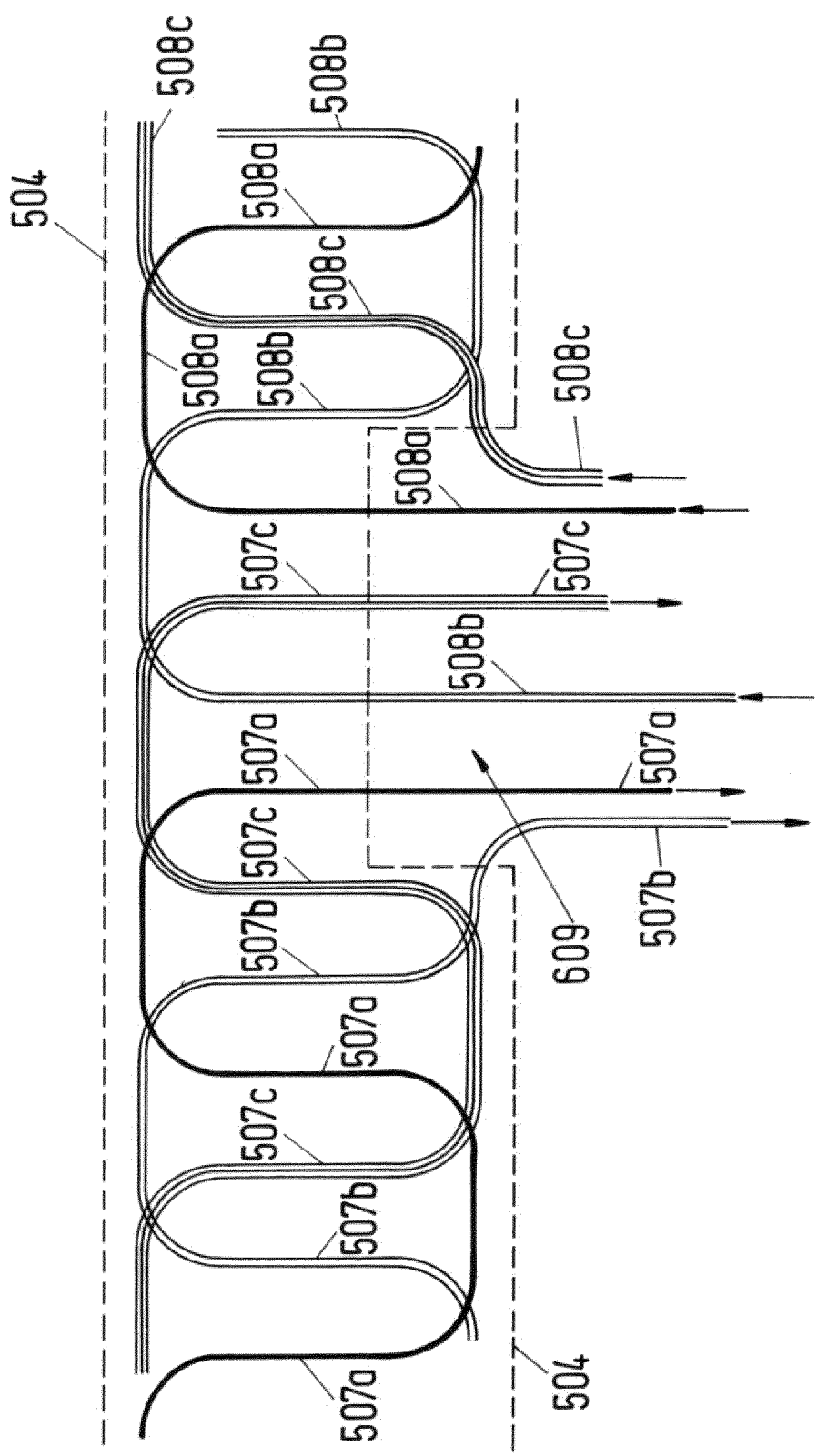
Figure 11:
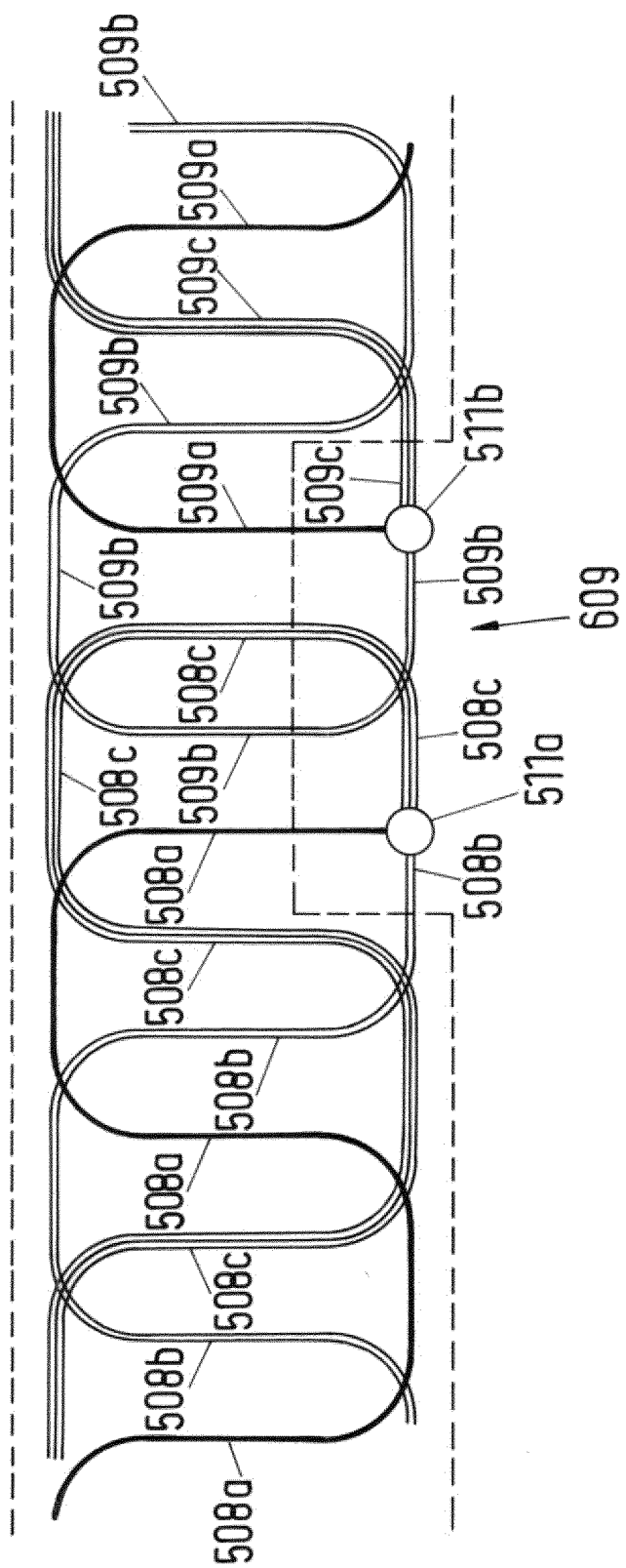

Each recess has a U-shaped cross-section to receive a cable. The dashed lines shown in FIG. 5 which extend along the recesses 315 are centre lines of the recesses 315. At each of the two opposite ends of the straight recesses 315, there are bifurcated curved recess regions 316 which form transitions to a peripheral straight recess 317 extending along the lateral edge of the block 304. Cables can be laid in a manner consecutively extending from the straight recesses 315 through the curved recess region 316 into the peripheral straight recess 317, thereby changing the direction of extension from perpendicular to the direction of travel to parallel to the direction of travel. Examples of arrangements of electric lines (e.g. cables) are shown in FIGS. 10 and 11 and will be described later.

The curved recess regions 316 allow for placing a cable, which extends through the recess 315, in such a manner that it continues to either the left or the right, if viewed in the straight direction of the recess 315. For example, a cable (not shown in FIGS. 4 and 5) may extend through recess 315b, may turn to the right—while extending through recess region 316—and may then extend through the straight recess 317 which extends perpendicularly to the recesses 315 on the opposite side of curved recess region 316. There are two peripheral straight recess regions 317 on opposite sides of block 304. The cable may then turn to the right through the recess region 316 at the end of recess 315e and may then extend through recess 315e. At the end of recess 315e, which is shown in the lower part of FIG. 5, the cable may again turn left through recess region 316 into the other straight recess 317. The other recesses 315 may be used for two other cables.

Figure 6:
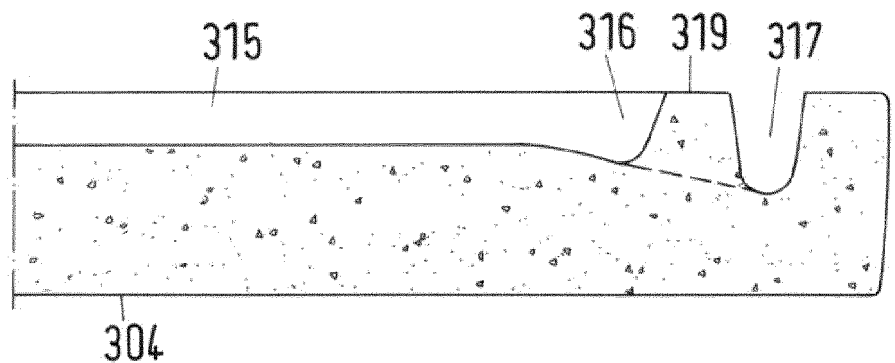
Figure 6:
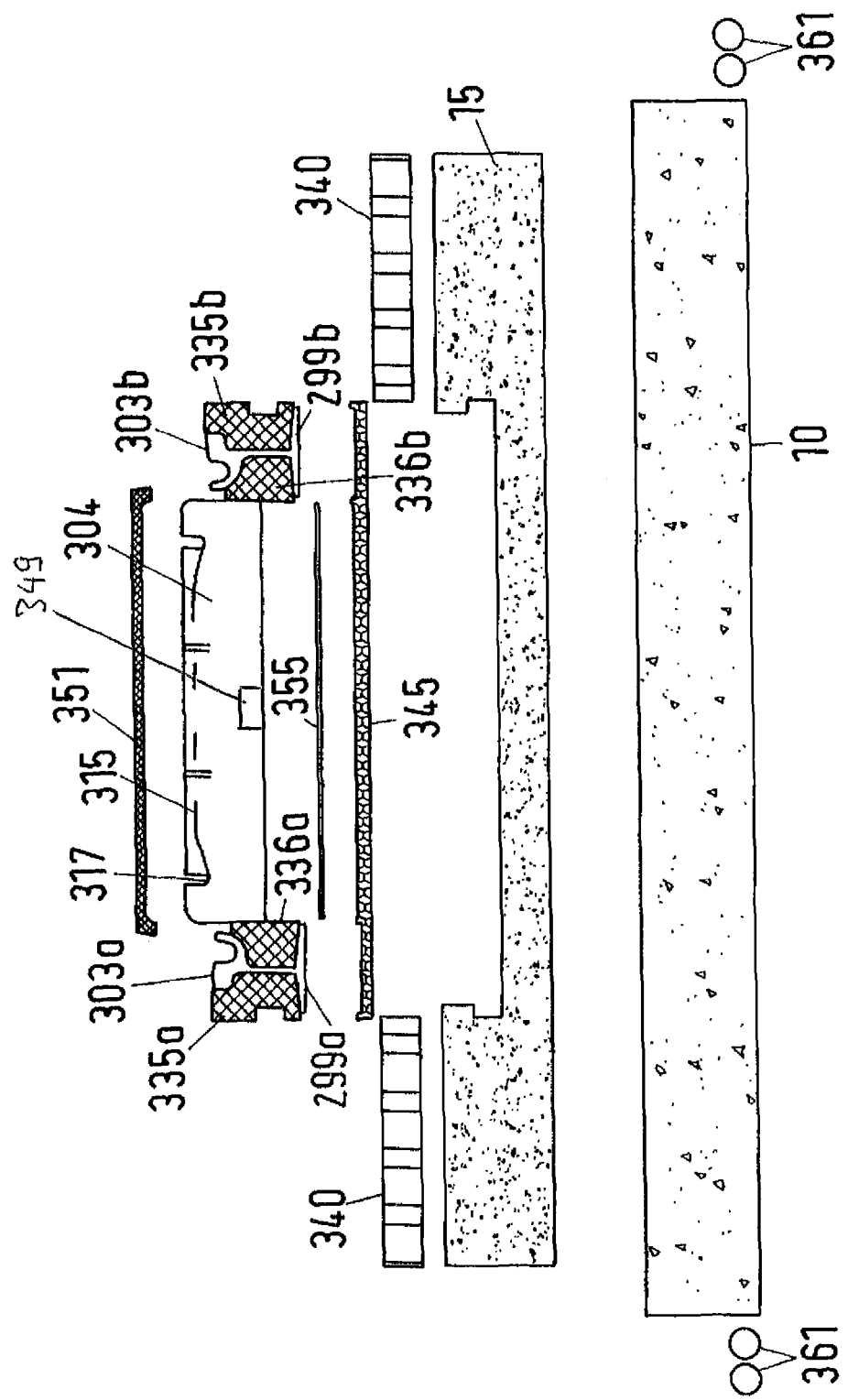

As shown in FIG. 6, the depth of the recesses 315, 316, 317 is different. The depth of recess 315 is sufficient to receive one cable. The depth of the curved recess region 316 increases from the end of recess 315 to recess 317 as indicated by a dashed line in FIG. 6. The bottom profile of the curved recess region 316 is not fully shown in FIG. 6, since the sectional view includes a region 319 of block 304 which is not recessed. Each of the curved recess regions 316 comprises such an island region 319 which is located between the two curved branches of the curved recess region 316. One of the branches extends above the plane of FIG. 6 and the other branch extends below the plane of FIG. 6. In addition, the island region 319 is located between the straight recess 317 and the two branches of the curved recess region 316.

Since the depth of the curved recess region 316 increases towards the straight recess 317, different cables can be laid upon one another. The depth of the straight recess 317 is sufficient to arrange two cables upon one another extending in the same straight direction. For example, a first cable may extend trough the lower recess 317 in FIG. 5 and may turn left into recess 315b through the recess region 316 shown in the bottom left part of FIG. 5. In addition, a second cable may extend trough recess 315a, may turn into the recess 317, thereby crossing (if viewed from above) the first cable.

The example concerning the extension of cables or electric lines given above refers to one specific application for laying three meandering cables. However, the use of the shaped block 304 shown in FIGS. 4 to 6 is not restricted to this application. Rather, for example, less or more than three cables can be laid using the block 304 shown in FIGS. 5 and 6.

The side surfaces of block 304 shown in FIG. 4 comprise recesses, in particular bores, 290a, 290b, 292a, 292b, 292 c. Other recesses are located at the side surfaces which are not visible in FIG. 4. In the example shown, the side surface which extends in the direction of travel (on the right hand side in FIG. 4) comprises three recesses 292a, 292b, 292c. All recesses 292 contain an anchor 294a, 294c, wherein the anchor or recess 292b is not shown. The anchors 294 extend as projections from the side surface. When the cover layer is provided to fill the regions sideways of 304, the anchors 294 are embedded by the material of the cover layer.

The recesses 290a, 290b of the side surface which faces in the direction of travel also comprise anchors 291, wherein the anchor of recess 290a is not shown in FIG. 4. These anchors are fixed within the recesses 290 before the neighbouring block (not shown in FIG. 4) is placed near the side surface. The neighbouring block is moved towards the side surface of block 304 so that the anchors 291 are inserted in corresponding recesses of the neighbouring block. Then, or immediately before, filling material is introduced in the corresponding recesses of the neighbouring block in order to fill gaps between the anchors 291 and the corresponding recesses. The filling material may be a two-component adhesive.

FIG. 7 shows a cross-section through the construction of a track for a rail vehicle. FIG. 8 shows an exploded cross-sectional view through a modified construction of a track for a rail vehicle. In both figures, the two rails extending in parallel to each other are denoted by 303a, 303b. In between the rails 303, a block 304 is placed for receiving cables. The block 304 may be the pre-fabricated shaped block of FIG. 4. The embodiments shown in FIGS. 7 and 8 differ with respect to a base layer 10 which is rectangular in FIG. 8 and is U-shaped in FIG. 7. In addition, FIG. 7 shows the underground 35. Furthermore, FIG. 7 shows two parts of the ground 12 on both sides of the track. Common parts and elements of the route construction according to FIGS. 7 and 8 will be described in the following using the same reference numerals. Differences, for example with respect to the magnetic core, will be emphasized.

For preparing the placement of a pre-fabricated track module (consisting of an plurality of elements), the underground comprises a base layer 10 of concrete. In addition, on both opposite sides of the base layer 10, conduits 361 are laid (shown only in FIG. 8). In particular, these conduits 361 are used to place electric connection cables for connecting electric and electronic devices of the track module. These cables are parts of a power supply line, for example connecting inverters located sideways of the track in a cavity.

All other parts shown in FIG. 8, are parts of the pre-fabricated track module, except for a brick layer 340 which is laid on the top surface of the pre-fabricated track module. The brick layer 340 extends on both sides of the central region of the pre-fabricated track module where the rails 303 and other parts are located. The brick layer 340 serves to form a nearly horizontally extending surface of the track construction (see FIG. 7). Instead of a brick layer, the gap between the ground 12 and the central part of the track module can be filled by another material, such as concrete.

The embodiment of the track module, which is shown in FIGS. 8 and 7 comprises a U-shaped bottom layer 15, preferably made of concrete. Any kind of concrete material may be used, such as conventional concrete, concrete comprising plastic material and fibre reinforced concrete. Especially, the concrete may be armed by conventional metal meshes. However, it is preferred to use light weight concrete comprising fibre particles for reinforcement and comprising plastic elements. Such a concrete material has the further advantage that vibrations caused by any rail vehicle travelling on the track are attenuated.

The U-shaped bottom layer 15 defines the central region of the track module which is located in the cut-out area in between the two arms of the U. This central cut-out area is open to the top and comprises from bottom to top a layer 345 made of elastomeric material for further damping of vibrations, a shielding element 355, a support element 304 for supporting the conductor arrangement (not shown in FIGS. 8 and 7) and a cover 351 made of rubber.

The layer 345 extends in horizontal direction over the whole length of the central region of the track module. In the regions of the side margins of the central regions, the two rails 303a, 303b are placed on top of the layer 345. As principally known in the art, the rails 303 are held in place using inner and outer fixing elements 335, 336, preferably made of plastic material, such as polyurethane. The support element 304 comprises recesses 315, 317 and may be constructed as shown in FIGS. 1 to 5. The support element 304 is fitted tightly in between the inner fixing elements 336.

Below the support element 304, the shield 355 for shielding electromagnetic fields generated by the conductor arrangement extends between the shoes 299a, 299b, thereby electrically contacting the shoes 336. In an alternative embodiment, the shield may be connected to just one of the rails. This embodiment is used if the track is combined with a vehicle detection system using the effect that the vehicle is electrically connecting the two rails.

The cover 351 extends between the upper parts of the two rails 303 and is mechanical fixed by protruding downwardly into the grooves between the support element 304 and the rail 303. Other than shown in FIG. 8, the pre-fabricated track module, comprising the parts 15, 345, 355, 335, 336, 304 and 351 (and optionally comprising further parts, such as the conductor arrangement) is manufactured first and then positioned on top of the base layer 10. However, the different parts of the track module can be removed on site, for example the cover 351 for placing the conductor arrangement into the recesses 315, 317. After laying the conductor arrangement, the cover can be put in place again. As mentioned before, the conductor arrangement can alternatively be part of the pre-fabricated track module so that there is no need to remove the cover 351, except for maintenance and repair.

Preferably, the conductor arrangement is placed within the recesses of the support element in such a manner that the lines or wires of the conductor arrangement do not protrude above the height level of the edges of the recesses. Therefore, the cover having a nearly planar surface pointing to the support element can rest on the maximum possible upper surface of the support element.

The construction shown in FIG. 7 comprises a recess 339 on the underside of an intermediate layer 341, which is placed between the shield 355 and the shaped module 304. In contrast to the construction shown in FIG. 8, the shaped module 304 of FIG. 7 does not extend to the shield 355, but is separated from the shield 355 by the intermediate layer 341.

Alternatively to the construction shown in FIG. 7, the recess 339 may be located on the upper side of the intermediate layer 341 and/or may be located on the underside of the shaped module 304, similar to the construction shown in FIG. 8. However, the shaped module 304 of FIG. 8 extends in vertical direction to the shield 355, i.e. there is no intermediate layer between the shaped module 304 and the shield 355. The recess for the magnetic core in the construction shown in FIG. 8 is denoted by reference numeral 349.

Figure 12:
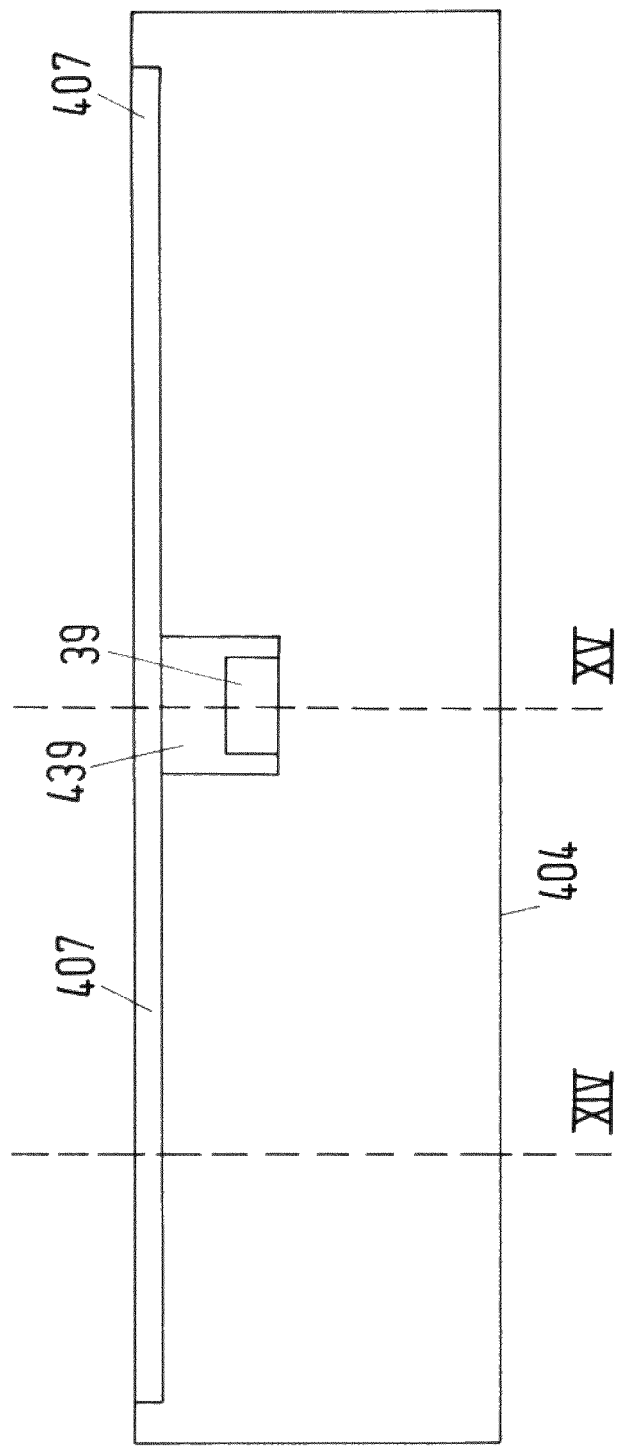

The recesses 339, 349 shown in FIGS. 7 and 8 extend in the direction of travel which is perpendicular to the image plane of the Figures. At least part of the recess 339, 349 with respect to the vertical direction is filled with magnetic core material (not shown in FIGS. 7 and 8), similarly to the schematic view shown in FIG. 12. However, the FIG. 12 shows a variant in which the recess 439 is provided on the upper side of a shaped block or material layer 404 and is, therefore, open to the top. During construction of the route, the recess 439 will be filled with magnetic core material 39 up to a certain, pre-defined height and then the line or lines of the primary side conductor arrangement are laid. One line section 407 which extends transversely to the direction of travel (the direction of travel is perpendicular to the image plane of FIG. 12) is shown in FIG. 12. The shield (not shown in FIG. 12) may be located at the bottom surface of the shaped module or material layer 404 or may be located further below.

In the embodiment shown in FIG. 7, the shield 355 is laid first and then the pre-fabricated intermediate layer 341, which already includes the magnetic core material within the recess 339, is placed on top of the shield 355. For example, the magnetic core material may be fixed to the intermediate layer module 341 using adhesive. Alternatively, the magnetic core material may be placed first on top of the shield 355 and then the intermediate layer 341 may be produced from non-solid raw material, such as concrete.

The production of the magnetic core in the construction shown in FIG. 8 may be performed in the same manner as explained before for the construction shown in FIG. 7. However, there is no intermediate layer in FIG. 8 so that the magnetic core material is either fixed to the shaped module 304 before placing the shaped module 304 on top of the shield 355 or is placed first on top of the shield 355, before placing the shaped module 304 on top of the arrangement.

Figure 9:
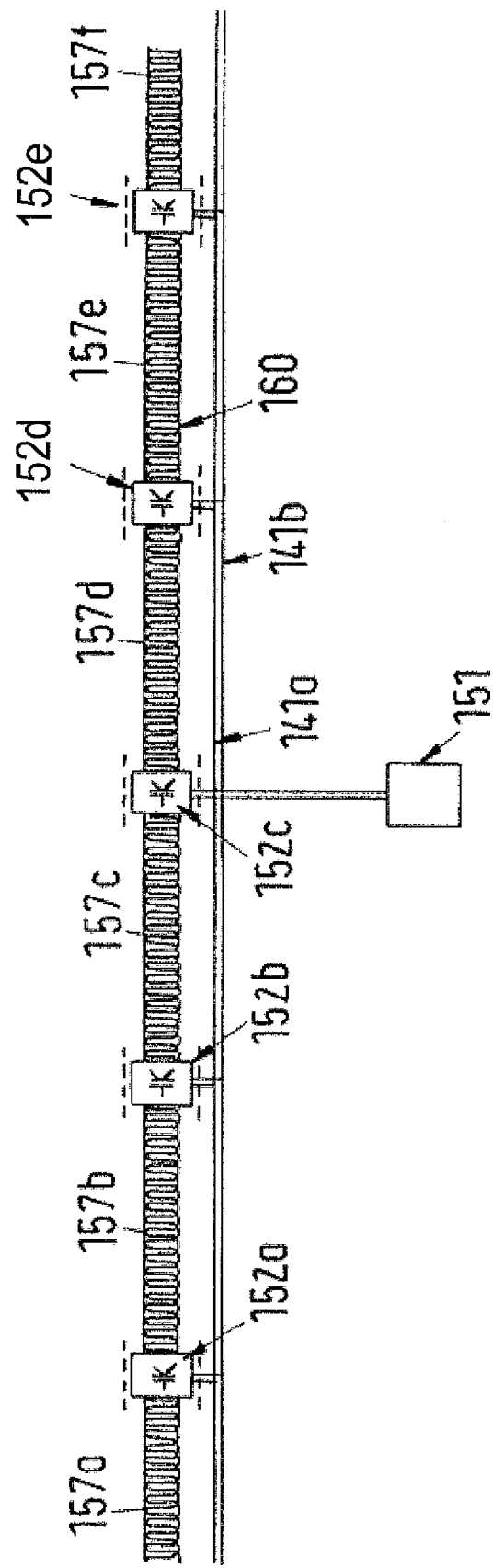

FIG. 9 shows six segments 157a to 157f of a conductor arrangement which extend along a path of travel (from right to left or vice versa) of a vehicle (not shown). The segments 157 can be operated independently of each other. They are electrically connected in parallel to each other. The vehicle may comprise a receiving device for receiving the electromagnetic field produced by one or more than one of the segments 157. If, for example, the receiving device of the vehicle is located above segment 157c at least this segment 157c is operated to produce an electromagnetic field and to provide energy to the vehicle. Furthermore, the vehicle may comprise energy storages which may be used to operate the vehicle if not sufficient energy is received from the segments 157.

At each interface between two consecutive segments 157, an inverter 152a to 152e is provided which is placed within a cavity, preferably within the ground sideways of the route. A DC (direct current) power supply line 141a, 141b is also shown in FIG. 9. It is connected to an energy source 151, such as a power station for producing a direct current.

FIG. 10 schematically shows by dashed lines the outer limits 504 of a track or part of a track which may be defined by shaped blocks 304 of the kind shown in FIG. 4, with the exception that there is an area 609 for conducting lines to and/or from the track. For example, the area 609 may be located in a cut-out 341 at one side of the block. Such a cut-out facilitates completing the conductor arrangement made of electric lines which are held by the blocks in place.

The conductor arrangement shown in FIG. 10 is a three-phase conductor arrangement, i.e. each of the two segments of the conductor arrangement shown in FIG. 10 comprises three phase lines 507a, 507b, 507c; 508a, 508b, 508c for conducting three phases of a three phase alternating electric current. One of the three phases 507a, 508a is indicated by a single line, the second of the three phases 507b, 508b is indicated by a double line and the third of the three phases 507c, 508c is indicated by a triple line. All electric lines are extending in a meandering manner in the direction of travel (from left to right or vice versa). The region shown in FIG. 10 is a transition region of two consecutive segments of the conductor arrangement. Each segment can be operated separately of each other, but the segments can also be operated simultaneously. FIG. 10 shows a preferred embodiment of a basic concept, namely the concept of overlapping regions of the consecutive segments. Preferably the shield (not shown, e.g. located in parallel to the image plane of FIG. 10) covers the area delimited by the dashed lines 504, the area 609 and the area where the lines 507, 508 are conducted to devices sideways of the track or route.

The meandering three-phase conductor arrangement, which is described in the following can also be realised, if the connection to external devices is made in a different manner. The segment shown on the left hand side in FIG. 10 comprises phase lines 507a, 507b, 507c. Following the extension of these phase lines 507, from left to right, each phase line 507 which reaches the cut-out area 609 is conducted away from the consecutive line of shaped blocks towards any device (not shown) for operating the phase lines 507. For example, phase line 507b reaches cut-out 609 where the cut-out 609 ends. In contrast to phase line 507b, phase lines 507a, 507c reach the cut-out 609 with a line section which extends from the opposite side of the line of shaped blocks towards the cut-out 609.

The three phase lines 507 each comprise line sections which extend transversely to the direction of travel. These transversely extending sections form a repeating sequence of phases in the direction of travel, i.e. a section of the first phase line 507a is followed by a section of the second phase line 507b which is followed by a line section of the third phase line 507c and so on. In order to continue with this repeated sequence of the phase lines, a phase line 508b (the second phase line) of the neighbouring segment is conducted through the cut-out area 609 so that it forms a transversely extending line section in between the first phase line 507a and the third phase line 507c of the other segment where they reach the area 609. In other words, the second phase line 508b of the second segment replaces the second phase line 507b of the first segment in order to continue with the repeated sequence of phase lines. The other phase lines of the second segment, namely the first phase line 508a and the third phase line 508c are conducted through cut-out area 609 in a corresponding manner so that the sequence of phases, if the extension in the direction of travel is considered, is the same as for the first segment on the left hand side of FIG. 10.

FIG. 11 shows a similar arrangement, in which the area 609 is used for a different purpose. Same reference numerals in FIG. 10 and FIG. 11 refer to the same features and elements.

FIG. 11 shows the transition region of two consecutive segments, for example the segment shown on the right hand side in FIG. 10 and a further segment of the conductor arrangement. The phase lines of this further segment are denoted by 509a (first phase line), 509b (second phase line) and 509c (third phase line) of the further segment. In the embodiment shown in FIG. 11, the cut-out 609 is used as an area for establishing electric connections between the three phases of each segment, i.e. a star point connection is made for each segment. The star points are denoted by 511a or 511b. Preferably, the location of the star point 511 is at a greater distance to the upper surface of the cover layer than the line sections of the phase lines where the phase lines are located within the recesses or spaces which are defined by the shaped blocks. Therefore, the star point connections are well protected.

Figure 13:
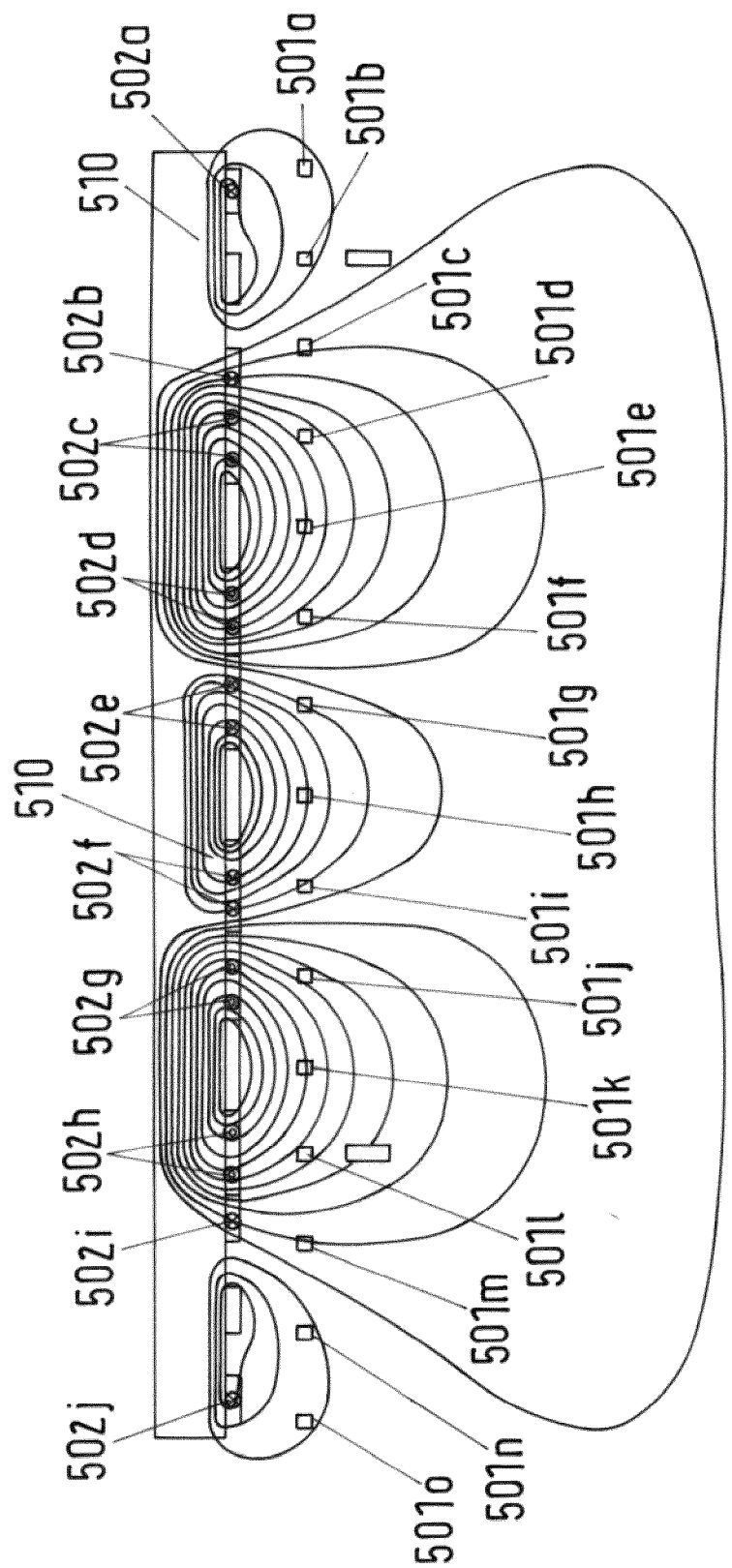
Figure 14:
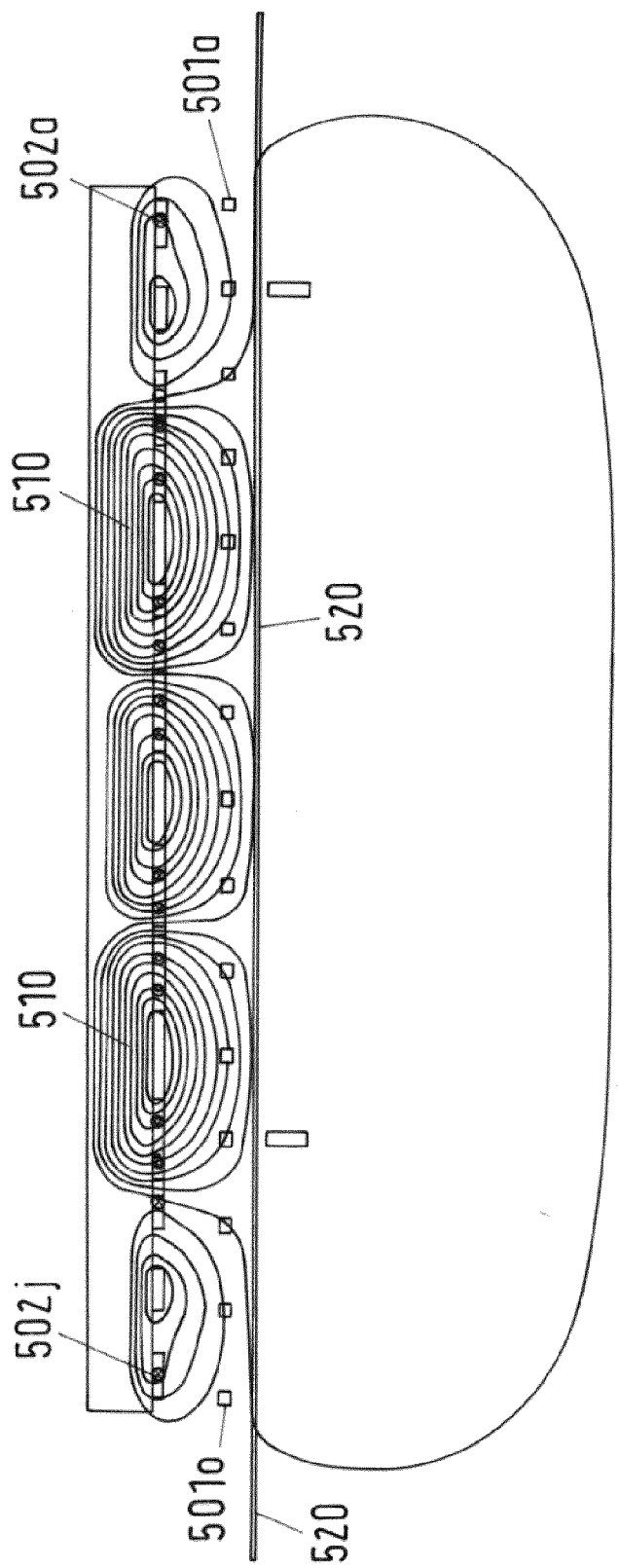

FIGS. 13 to 15 show a schematic side of view of a system for inductively transferring energy to a vehicle, including the primary side and the secondary side electric lines. The primary side lines are shown as small rectangles 501a-501o. These rectangles symbolise cross sections of transversely extending line sections of the electric lines of a three-phase conductor arrangement, for example of the arrangement shown in FIGS. 10 and 11. These transversely extending line sections 501 produce the alternating electromagnetic field, and produce in particular a magnetic wave which moves into the travel direction or opposite to the travel direction. The travel direction extends from left to right or from right to left in FIGS. 13 to 15.

At a higher position in FIGS. 13 to 15, the conductors of the secondary side arrangement of the vehicle are shown and denoted by 502a-502i. These secondary side conductors also extend transversely to the direction of travel. On top of the secondary side conductors 502, there is a layer of magnetic core material 510. However, the height of the core 510 is not drawn to scale in order show the course of magnetic flux lines. The same applies to the magnetic cores 510, 530 in FIG. 14 and FIG. 15. All these magnetic cores are preferably smaller in vertical direction compared to the vertical extension of the primary side and secondary side conductors and the vertical distances between these conductors.

FIGS. 13 to 15 also show the magnetic flux lines (i.e. field lines of the magnetic field which is produced by the primary side conductors 501 for three different configurations and/or locations of the cross sections shown in the figures.

FIG. 13 shows a configuration in which there is no shield of electrically conductive material below the primary side conductors 501 and in which there is no magnetic core material below or at the primary side conductors 501. Consequently, the flux lines deeply penetrate in areas below the primary side conductor arrangement.

FIG. 14 shows a configuration in which there is a shield 520 of electrically conductive material below the primary side conductors 501. The shield 520 almost completely prevents the penetration of magnetic field lines through the shield 520. As a result, the field lines are diverted above the shield 520 so that they extend nearly horizontally between the shield 520 and secondary side conductor arrangement 502. However, due to energy losses caused by eddy currents within the shield 520, the magnetic flux at the secondary side conductor arrangement is reduced.

The configuration shown in FIG. 15 comprises a layer or line of magnetic core material 530 instead of the shield 520 of the configuration shown in FIG. 14. The vertical position of the magnetic core material 530 is slightly higher than the vertical position of the shield 520 in FIG. 14.

The effect of the magnetic core material 530 is that the magnetic field lines are attracted, i.e. extend nearly perpendicularly to the magnetic core material 530, but are re-directed by the magnetic core material 530 to follow the horizontal extension of the layer or line. Furthermore, the magnetic core material 530 increases the magnetic flux at the secondary side conductor arrangement.

Coming back to the configuration shown in FIG. 12, provided that there is an additional shield below the magnetic core material 39 extending horizontally, i.e. parallel to the transversely extending line section 407, the configuration shown in FIG. 15 corresponds to the cross section indicated by a dashed line XIV in FIG. 12. I.e. the cross section shown in FIG. 14 would extend perpendicularly to the image plane of FIG. 12 at the dashed line XIV. Similarly, the cross section shown in FIG. 15 would extend perpendicularly to the image plane of FIG. 12 at the dashed line XV which intersects the magnetic core 39. This means that the configuration shown in FIG. 14 and the resulting magnetic flux lines shown in FIG. 14 represent the situation approximately in the area of dashed line XIV in FIG. 12 and that the configuration and magnetic flux lines shown in FIG. 15 represent the situation at the dash line XV in FIG. 12. The reason why the shield of electrically conducting material has no influence on the situation shown in FIG. 15 is that the magnetic core material attracts and redirects the magnetic flux lines. However, due to the small thickness of the magnetic core material, a comparatively small magnetic flux is effective even immediately below the magnetic core material as shown in FIG. 15 by one magnetic flux line below the magnetic core material 530.

If the induction which is caused by the magnetic field in the secondary side conductor arrangement is integrated over the length of transversely extending line sections (i.e. from left to right in FIG. 12, the total induction and the resulting electric current may correspond to the corresponding situation without shield and magnetic core at the primary side, if the magnetic core and the shield are configured appropriately. The shield reduces the magnetic flux, but shields nearly the full area below the shield, and the magnetic core material increases the magnetic flux in the central area of the cross section shown in FIG. 12. In other words: the shield helps to reduce the required amount of magnetic core material and the flux-weakening effect of the shield is compensated by the magnetic core material.

The invention claimed is:

1. A system for transferring electric energy to a vehicle travelling on a track in a direction of travel, wherein the system comprises an electric conductor arrangement for producing a magnetic field and for thereby transferring the energy to the vehicle, wherein the electric conductor arrangement comprises at least one current line, wherein each current line is adapted to carry the electric current which produces the magnetic field or is adapted to carry one of parallel electric currents which produce the magnetic field and wherein:
   the at least one current line extends at a first height level,
   the system comprises an electrically conductive shield for shielding the area below the conductor arrangement against the magnetic field, wherein the shield extends below the first height level, and
   a magnetic core extends along the track in the direction of travel at a second height level and extends above the shield, wherein the material of the magnetic core is placed in grooves, or recesses or grooves and recesses of pre-fabricated modules adapted to carry the material and to fix the at least one current line.

2. The system of claim 1, wherein the second height level at which the magnetic core extends is below the first height level and wherein the magnetic core extends between the shield and the at least one current line.

3. The system of claim 1, wherein the shield extends in a layer substantially parallel to the track.

4. The system of claim 3, wherein the shield comprises a plurality of sheets of electrically conductive material or the shield is a mesh of metal.

5. The system of claim 1, wherein the width of the magnetic core in a direction transverse to the direction of travel and transverse to the direction of height is less than 30% of the width of the electric conductor arrangement.

6. The system of claim 1, wherein the material of the electrically conductive shield is not ferromagnetic, wherein ferrites are understood to be ferromagnetic materials.

7. The system of claim 1, wherein the at least one current line comprises a plurality of line sections extending transversely to the direction of travel at the first height level.

8. The system of claim 1, wherein the shield extends under the track.

9. A method of building a system for transferring electric energy to a vehicle travelling on a track in a direction of travel, wherein an electric conductor arrangement for producing a magnetic field and for thereby transferring the energy to the vehicle is provided, wherein at least one current line is provided for the electric conductor arrangement, the at least one current line being adapted to carry the electric current which produces the magnetic field or is adapted to carry one of parallel electric currents which produce the magnetic field and wherein:
   the at least one current line is arranged to extend at a first height level,
   an electrically conductive shield is provided for shielding the area below the conductor arrangement against the magnetic field, wherein the shield is arranged so that it extends below the first height level, and
   a magnetic core is provided so that it extends along the track in the direction of travel at a second height level and so that it extends above the shield, wherein the material of the magnetic core is placed in grooves, or recesses, or grooves and recesses of pre-fabricated modules so that the modules carry the material and wherein the at least one current line is fixed by the modules.

10. The method of claim 9, wherein the second height level at which the magnetic core extends is below the first height level and wherein the magnetic core is provided so that it extends between the shield and the at least one current line.

11. The method of claim 9, wherein the shield is provided so as to extend in a layer substantially parallel to the track.

12. The method of claim 11, wherein a plurality of sheets of electrically conductive material or a mesh of metal is provided for the shield.

13. The method of claim 9, wherein the width of the magnetic core in a direction transverse to the direction of travel and transverse to the direction of height is less than 30% of the width of the electric conductor arrangement.

14. The method of claim 9, wherein a material is used for the electrically conductive shield which is not ferromagnetic, wherein ferrites are understood to be ferromagnetic materials.

15. The method of claim 9, wherein the at least one current line is arranged so that it comprises a plurality of line sections extending transversely to the direction of travel at the first height level.

16. The method of claim 9, wherein the shield is arranged so that it extends under the track.

\* \* \* \* \*